Dec. 19, 1950     R. M. BERGLUND     2,534,219
FISH BONING DEVICE

Filed May 13, 1946     2 Sheets-Sheet 1

Inventor,
RALPH M. BERGLUND
By Simmes, Keegin, Beale and Semmes Attys.

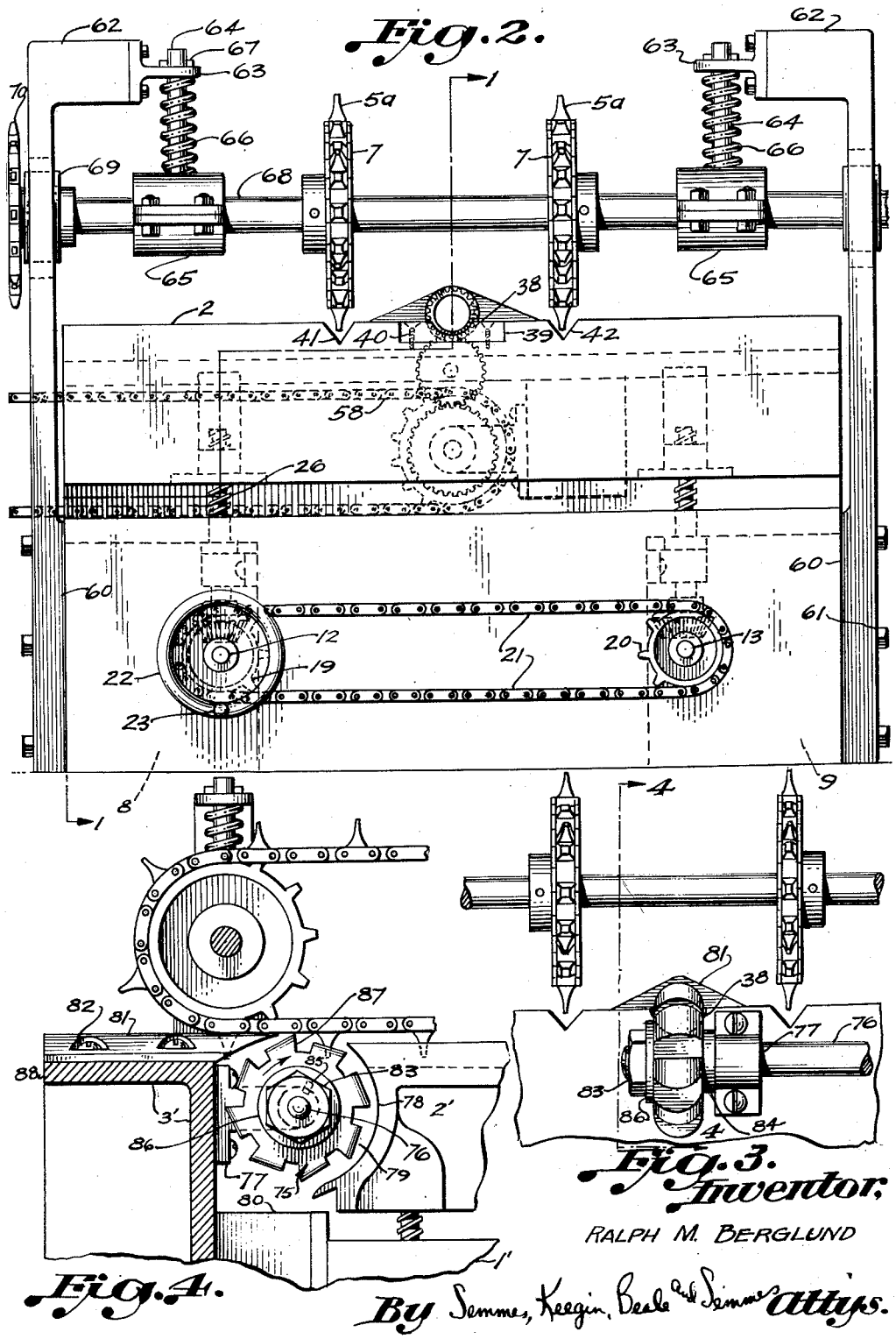

Patented Dec. 19, 1950

2,534,219

UNITED STATES PATENT OFFICE 2,534,219

FISH BONING DEVICE

Ralph M. Berglund, Bellingham, Wash., assignor to Pacific American Fisheries, Inc., Bellingham, Wash., a corporation of Washington Application May 13, 1946, Serial No. 669,344

12 Claims. (Cl. 17—3)

This invention relates to a cutting device, and more particularly to a machine for removing the backbones of fish.

In the preparation of fish for canning, it has become apparent that some rapid mechanical means of cleaning the fish and removing their backbones is necessary. If these operations are carried out by hand they are time consuming and result in high labor cost in the preparation of the fish. A number of machines have been developed in an effort to reduce the manual labor required in the canneries. Some of these machines carry a split fish with its flesh side up along a moving base. An operator standing nearby guides a rotating knife along the fish to separate the backbone from the flesh. In others, an operator directs a relatively long rotating tubular cutter through a whole fish from which the head had been removed and thus removes a cylindrical core containing the backbone from the fish. Both of these mechanisms require skilled labor and consequently, do not achieve the savings in labor desired for the machine. Other mechanisms heretofore developed have had similar drawbacks.

It is an object of this invention to provide a power driven machine which will rapidly remove the backbone from the fish.

Another object of this invention is to provide a fish boning machine which will eliminate the necessity for skilled labor for its operation.

Still another object of this invention is to provide a mechanical fish boning machine which will cleanly separate the backbone from the flesh of the fish.

A further object of this invention is to provide a fish boning machine with adjustable features which will permit its use on fish of widely different sizes.

With these and other objects in mind which will become apparent from the following description, this invention resides in a machine in which a split fish is mechanically carried along a guiding table, past power driven cutting means which cleanly removes the backbone from the fish.

In the drawings:

Figure 2 is an end elevation taken at the feed end of the machine illustrating the operation of some of the adjustable features of the machine.

Figure 3 is a fragmentary elevational view of the cutting element of a modified but preferred form of this invention.

Figure 4 is a sectional view along the line 4—4 in Figure 3 illustrating the location of the cutter of the preferred form of the invention in respect to the adjustable feed table.

Figure 1:
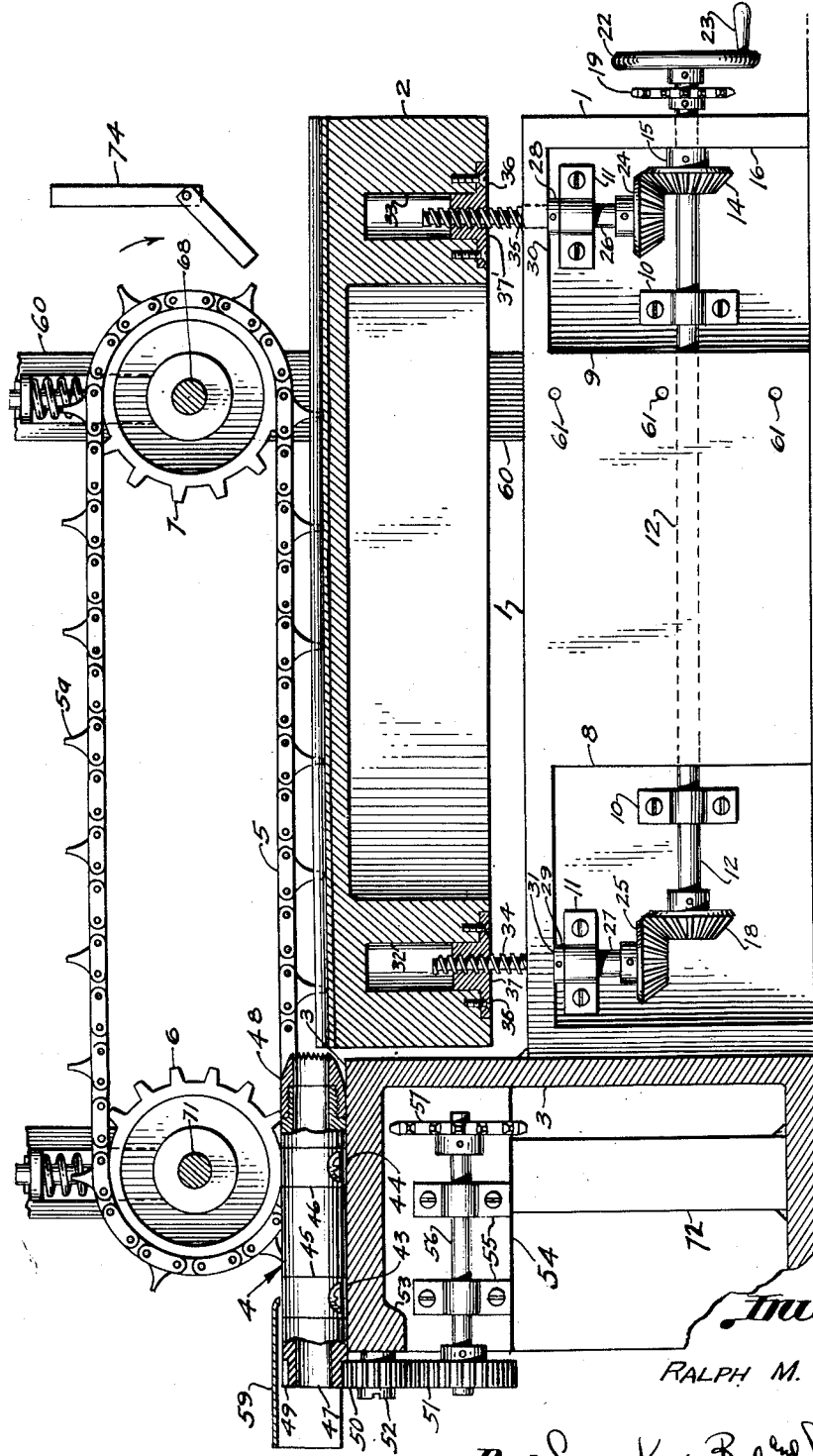
Figure 1 illustrates a longitudinal sectional view of the machine taken along the line 1—1 in Figure 2.

Referring to Figure 1 of the drawings, the machine of the present invention consists, in general, of a base 1 on which a table 2 is adjustably supported. A channel-shaped cutter supporting platform 3 is secured, preferably by welding, to one end of the base and extends above the base to a level ordinarily slightly below that of the table 2. A power driven cutting mechanism, indicated generally as 4, is rotatably mounted on the upper surface of the channel-shaped platform 3. Above the table and the platform, a conveyor comprising a pair of parallel chains 5, having spikes 5a, move over pairs of sprockets 6 and 7, one pair of sprockets being power driven. Briefly, the spikes 5a of the parallel chains 5 engage the body of the fish at the right-hand end (Figure 1) or feed end of the machine and move it over the surface of the table 2, forcing it to pass over the cutter where the backbone is removed, and disengage the fish at the left-hand discharge end of the machine.

The base consists of a generally rectangular block 1 having four recesses 8 and 9 essentially similarly disposed in respect to the longitudinal axis of the block along both sides thereof. In each of the recesses vertical hangers 10 and horizontal hangers 11 are secured to the inner wall. Parallel shafts 12 and 13 extend from outside of the right or feed end of the block 1 longitudinally through the block and pass through recesses 8 and 9. The hangers 10 provide support for shafts 12 and 13 in the recesses. Bevel gears 14 are secured to shafts 12 and 13 in recesses 9. The hubs 15 of the gears 14 bear against the wall 16 of recesses 9 to prevent longitudinal movement of shafts 12 and 13 toward the feed end of the machine. Displacement of the shafts toward the discharge end of the machine is, of course, prevented by bevel gears 14 in recesses 9 and bevel gears 18 in recesses 8.

Secured to the ends of shafts 12 and 13 which extend beyond the right or feed end of block 1, are sprockets 19 and 20, as best shown in Figure 2. In the drawings these sprockets and the various gears are attached to the shafts by means of set screws but, of course, they could be so attached by means of keys or any other suitable means. Sprockets 19 and 20 are connected by a chain 21. A hand wheel 22 is fixedly mounted on the end of shaft 12, adjacent to sprocket 19. For convenience in turning wheel 22, a spindle 23 is secured to its outer rim. Thus any turning of wheel 22 will rotate shaft 12 and sprocket 19. Chain 21 mounted upon sprocket 19 will move as the sprocket rotates and in turn cause an exactly similar rotation of sprocket 20, which is secured to shaft 13. It is seen that any rotation of wheel 22 causes shafts 12 and 13 to rotate in unison.

In engagement with bevel gears 14 and 18 are bevel gears 24 and 25 respectively which are secured to vertical shafts 26 and 27 which rotate in horizontal hangers 11 secured to the inner wall of recesses 9 and 8. Collars 28 and 29 are attached to the vertical shafts 26 and 27 at a point immediately above the hangers 11. Collars 28 bear against the upper surface 30 of recesses 9 and collars 29 against the upper surface 31 of recesses 8 to prevent any upward movement of shafts 26 and 27. Downward movement of the shafts is prevented by the collars bearing against the upper surface of hangers 11. Because of the engagement of the bevel gears 24 and 25 with the bevel gears 14 and 18 the simultaneous rotation of shafts 12 and 13 produces an exactly similar rotation in all vertical shafts 26 and 27.

Shafts 26 and 27 extend above the upper surface of base 1 into recesses 32 and 33 in the under surface of the feed table 2. All of the vertical shafts are threaded as shown at 34 and 35 from a point immediately above the upper surface of collars 28 and 29 to the upper ends of the shafts. Internally threaded flanged bushings 37 and 38, through which the threaded portions of vertical shafts 26 and 27 pass are securely fastened by screws 36 in the lower ends of recesses 32 and 33.

It is seen that any turning of the adjusting wheel 22 acts through shafts 12 and 13 and bevel gears 14, 18, 24 and 25 to turn threaded shafts 26 and 27 in unison. Since the threaded portion of these vertical shafts are received in the bushings 37 and 37' any turning of the hand wheel will raise or lower the feed table 2. The turning of all of the vertical shafts in unison permits the table to remain on an even keel as it is adjusted.

Extending longitudinally along the center of the upper surface of table 2 for its full length is a straight guide channel 38 for the bone of the fish. Preferably this channel is machined in an insert 39 which fits in a groove in the upper surface of the feed table. Fully countersunk screws 40 hold the insert 39 securely in place. By merely replacing the insert with one having a different sized channel the machine may be adjusted for properly aligning the vertebrae of fish of various sizes with respect to the cutter. Parallel to channel 38 and extending along both sides of it are grooves 41 and 42. The grooves and the channel serve as a guiding means which assures the proper positioning of the fish as it approaches the cutter described in detail later in this specification.

Platform 3 is attached by welding or other suitable means to the base 1 and extends up along the discharge end of feed table 2. In the embodiment of the invention illustrated, the platform is made from a section of a channel member opening towards the discharge end of the machine. Secured by means of screws 43 and 44 to the upper surface of the platform 3, which serves as a surface over which the fish slides as it passes the cutter, are bearings 45 and 46. It is important that the bearings be axially aligned with the channel 38 in the feed table 1. These bearings are preferably of the needle roller type and fixedly support a hollow tube 47.

Threaded to the feed end of the tube 47 is a backbone removing implement comprising tubular cutter 48. This cutter is preferably made of high speed steel and should have a serrated cutting edge. The threaded attachment of the cutter to the hollow tube allows easy and rapid replacement of the cutters. Because of the threaded construction, a cutter of the proper size may easily be installed when the type or size of fish being processed is changed. It is preferred that the cutters 48 have a number of holes regularly spaced in a common plane around the outer surface for engagement by a spanner wrench to facilitate their installation and removal.

Hollow tubular member 47 serves as a shaft for the transmission of rotary motion to the cutter as well as a support on which the cutter is mounted. Formed in the outer surface of the discharge end of tube 47 are gear teeth 49. These teeth mesh with a floating gear 50 which provides working space between the tube 47 and a driving gear 51 located below the discharge end of the cutter. Floating gear 50 is secured to a pin 52 extending into a socket in an outer wall of the top part of the platform 3, thereby fixing its position of rotation.

A block 54 is fastened to the lower surface of the upper flange of the channel shaped platform 3 and serves as a base to which hangers 55 are attached. A shaft 56 with one end extending beyond the discharge end of block 54, turns in bearings encased in hangers 55. The driving gear 51 is secured to the extended end of the shaft 56 directly below the discharge end of tube 47.

Attached to the end of shaft 56 remote from the gear 51 is a sprocket 57. An endless chain 58 (see Figure 2) passes over the sprocket and is connected to a source of power (not shown) separate from the fish conveying mechanism. Thus power is received through the chain 58 and transmitted through sprocket 57, shaft 56, and gears 51, 50 and 49 to tubular shaft 47 which in turn imparts a rotary motion to the cutter 48. A guard plate 59 is firmly attached to the upper surface of bearing 46 and platform 3 to direct the flesh (and oil) of the fish away from the gears 49, 50 and 51 after passing the cutter.

Extending upwardly from both sides of the base 1 are posts 60, as is most clearly shown in Figure 2. These posts are rigidly attached to the base by means of bolts 61 but, of course, could be attached by any other suitable means. At the upper end of the posts 60, arms 62 project inwardly over the table 2 and T-shaped apertured brackets 63 extend inwardly from the inner ends thereof. Rods 64 pass vertically through the apertures in the brackets and carry bearings 65 at their lower ends. Mounted concentrically about rods 64 and below the apertured brackets are springs 66 which press against the lower surface of the T-shaped brackets and the upper surface of the bearings 65 to constantly urge the bearings downwardly. Extending through openings in the upper ends of the rods above the brackets 63 are pins 67 which engage the upper surface of the brackets 63 and thereby limit the downward movement of the rods 64.

Passing through the bearings 65 and extending outwardly beyond and through the posts 60 is a horizontal shaft 68 upon which are mounted the pair of sprockets 7. These sprockets should be located directly above the channels 41 and 42 in the upper surface of the feed table 2. The shaft 68 also rides in thrust bearings 69 which are vertically slidably mounted in openings in posts 60. One end of shaft 68 is extended far enough outwardly beyond post 60 to allow the mounting of a sprocket 70 thereon. Power may be transmitted from any suitable source outside the machine through a drive chain (not shown) in engagement with sprocket 70 for rotation of shaft 68.

With the exception that no external source of power is connected to it, a shaft 71 is supported by posts 72 at the discharge end of the machine by a structure exactly similar to that used to support shaft 68. The pair of sprockets 6 are secured to shaft 71 directly in line with the corresponding pair of sprockets 7 on shaft 68 so that the chains will move parallel to the grooves 41 and 42.

As before mentioned parallel endless chains 5 pass over the two pairs of sprockets 6 and 7. In operation, the chains are moved by power received from the pair of sprockets 7. Sprockets 6 merely turn with shaft 71 and serve to keep the chains taut and hold them in the proper alignment with respect to grooves 41 and 42.

Extending outwardly at regular intervals from the chains 5 are spikes 5a. When shafts 68 and 71 are in their farthest downward position, spikes 5a should extend a short distance into the grooves 41 and 42. During operation, when a fish-half is placed on the feed table, it will force the chains 5 upward slightly. This movement is made possible by the slidable mounting of bearings 69 in posts 60 and 72 and the use of springs to support the bearings 65 resiliently from T-shaped brackets 63.

A safety guard 74 is provided to prevent the operator from becoming entangled with the spiked chains 5. If desired, it may be linked to some mechanism which operates an alarm or warning device or may simply bar access to the chains.

The preferred form of the cutting means used in this invention is best illustrated in Figure 4. A cutter 75 of the milling type is secured to a shaft 76 which rotates in bearings supported in a hanger 77 secured to the vertical side wall of platform 3' adjacent to the feed table 2'.

The cutter 75 rotates in a space between the feed table designated by the number 2' and adjacent the side of the platform 3' in this form of the invention. Thus it is necessary that the feed table 2' have a curved groove, outlined by curved surface 78, at its discharge end. Cutter 75 extends into the groove. The channel formed by surface 78 allows the discharge end of the feed table 2' to be adjacent to platform 3' on both sides of the cutter, thereby forming a continuous surface over which the fish can slide from the feed to the discharge end of the machine.

Between the cutter 75 and the curved surface 78 is a channel 79 through which the pieces of bone removed from the fish-half by the cutter fall. Since the chips of bones must fall clear of the machine, it is necessary that the base 1' be spaced from platform 3' near its center area below the cutter 75. The sides 80 of the base 1' should extend toward the discharge end of the machine and be securely attached to the platform 3'.

A guard 81 extends from the upper surface of platform 3', to which it is secured by screws 82, out over the cutter to prevent gouging of the flesh of the fish by the cutter teeth as they approach their uppermost position.

It will, of course, be desirable that the milling cutter be easily removed for repairs or sharpening. Also it will be desirable to vary the size of the cutter to allow the machine to operate at maximum efficiency on all sizes of fish. To facilitate the removal of the cutting element, the end of shaft 76 is threaded to receive a nut 83. When placing a cutter on the shaft, collar 84 is slipped into place over the shaft and against the hanger 77. The cutter 75 is next slipped into place on the shaft and secured thereto with key 85. Washer 86 is then placed next to the cutter and held firmly against it by nut 83. The cutting element is thus held securely in place on the shaft and in proper alignment with the channel 38 by the collar 84 which prevents axial movement toward the hanger 77 and the key 85 which prevents slipping on the shaft as it rotates.

Inasmuch as the larger cutters are designed for removing large bones they should be of greater thickness as well as diameter than the smaller cutters. Therefore a series of collars 84 of varying thickness will be required to align the center of the cutter properly with the center of the channel 38 of the feed table. For purposes of illustration channel 38 is indicated by a dotted line in Figure 3.

The shaft 76 extends outwardly beyond one side of the machine where it is connected to a source of power (not shown). The shaft is turned in a clockwise direction, indicated in Figure 4, to direct the teeth 87 of the cutter against the backbone of the fish, as it is moved toward the discharge end of the machine.

The operation of the machine is simple and easily controlled. After starting the motors which rotate the cutter and move the spiked chains, the fish-half, split along the dorsal-ventral axis, retaining the backbone is placed with the flesh side down at the feed end of table 2. The operator aligns the backbone of the fish in the channel 38. Spikes 5a on the roller chains 5 engage the flesh of the fish and move it along the upper surface of table 2. Springs 66 and slidably mounted bearings 69 provide a resilient support allowing vertical movement of the axis about which the chains rotate and thereby allow the insertion of fish of varying sizes underneath the roller chains 5. Grooves 41 and 42, in combination with channel 38 determine the path followed by the fish-half and guarantee the proper engagement of the backbone and the cutting element. This mechanical feature eliminates the necessity of a skilled operator being present to direct the cutting element along the backbone of the fish.

In the preferred form of the invention the rapidly rotating milling cutter 75 chips or mills sections of bone from the fish as it moves toward the discharge end of the machine. Guard 81 directs the boned fish away from the cutter to prevent gouging of its flesh. The boned fish is discharged from the edge of the machine 88 to a vessel or conveying means not shown in the drawing.

The operation of the machine having a tubular cutter is, in many respects, similar to the preferred form. In this case, however, as the backbone is cut from the flesh it passes through the hollow tube 47 and discharges from that member. The flesh of the fish passes over the outer surface of the tubular shaft and is discharged from the discharge end of the machine to any suitable container. The guard 59 directs the flesh of the fish away from the gears serving to rotate the cutter.

It is apparent that a machine constructed according to this invention is readily adaptable to handling fish of widely varying sizes. The feed table 2 may be raised or lowered as required by large variations in the fish or bone size. On the other hand, the spiked chains which convey the fish from the feed end to the discharge end of the machine are resiliently mounted to handle minor variations in fish size. If the backbone varies greatly in size the guiding channel in the feed table is easily replaceable which allows the backbone to be properly aligned with the cutting means. In addition, both forms of the cutting means are adapted to easy changing as required by vertebrae of varying sizes.

It is seen that the machine of this invention requires very little labor for its operation and the labor required is of an unskilled nature. After the fish has been placed on the feed table with its backbone properly aligned in the channel the machine carries out all of the subsequent operations mechanically.

In contrast with some machines or with the cleaning of fish by hand where a wedge shaped strip including the backbone and a strip of flesh adjacent to it is cut from the fish, this invention provides a means for cleanly separating the bone from the flesh with a minimum of waste of the flesh.

A machine of the type described is readily adaptable for installation in a production line because of the speed and simplicity of its operation.

Having described the features of the preferred form of this invention in detail, I wish it to be understood that the concept of this invention is not limited by those details but only by the appended claims.

I claim:

1. A fish boning machine comprising a feed table having its upper surface provided with a channel, said table being grooved parallel to and on both sides of said channel, conveying means located above said grooves and moving parallel to said channel, said conveying means having guiding elements adapted to move in said grooves, driving means to move said conveying means, and cutting means aligned with said channel.

2. A fish boning machine comprising a feed table having its upper surface provided with a channel, said table being adjustable vertically and grooved parallel to and on both sides of said channel, a pair of spiked endless chains located above said grooves and moving parallel to said channel with the spikes extending slightly into said grooves, said spikes constituting guiding elements as they move in said grooves, driving means to move said chains, and cutting means aligned with said channel.

3. A fish boning machine comprising a feed table having its upper surface provided with a channel, said table being adjustable vertically, grooves in said table parallel to said channel, a pair of spiked endless chains resiliently mounted above said grooves and moving parallel to said channel, said chains having guiding elements adapted to move in said grooves, driving means to move said chains, and power driven cutting means aligned with said channel.

4. A fish boning machine comprising an adjustable feed table, a replaceable channelled insert mounted in the working surface of said table, a milling cutter aligned with said channelled insert, and conveying means to move a fish-half along said table over said milling cutter.

5. A fish boning machine comprising a feed table having its upper surface provided with a channel, a rotating milling cutter aligned with said channel, and resiliently mounted conveying means for moving a fish-half along said table, said channel guiding the fish-half against said cutter.

6. A fish boning machine comprising a feed table adjustably mounted upon a plurality of threaded supports mechanically connected to turn in unison, power driven rotating cutting means, and a pair of power driven spiked endless chains mounted above said table and moving to draw an object to be boned past said cutting means.

7. A fish boning device comprising a feed table having its upper surface provided with a channel adjustably mounted on a plurality of threaded supports connected mechanically to turn in unison, grooves in said table parallel to and on each side of said channel, tubular cutting means aligned with said channel, a pair of spiked endless chains located above said grooves to engage the fish, the spikes on said chains being positioned to move in said grooves to control the movement of the fish, said chains moving parallel to said channel past said cutting means, and driving means to rotate said cutting means and move said chains.

8. A fish boning device comprising an adjustable feed table, a replaceable channelled insert mounted in said table surface, a tubular cutter aligned with the channel in said insert, means to move the object to be boned along said table over the tubular cutter, and means to rotate said cutter.

9. A fish boning machine comprising an adjustable feed table, a replaceable channelled insert mounted in said table surface, grooves in said table surface parallel to and on both sides of said channelled insert, a rotating milling cutter aligned with the channel in said insert, and resiliently mounted conveying means to move a fish-half along said table surface and over the milling cutter, said conveying means having guiding elements adapted to move in said grooves, the channelled insert and grooves determining the path followed by the fish.

10. In apparatus for removing the exposed backbone from split fish, a feed table having a fixed straight upwardly presented elongated guide, a conveyor for the fish having flights located on opposite sides of said guide and moving parallel thereto, said conveyor having means for engaging the body of a fish placed on said guide with its exposed backbone in contact therewith and for moving the fish relatively along the length of said guide, and a rotary backbone removing implement mounted adjacent said table and in alignment with said guide.

11. In apparatus for removing the exposed backbone from split fish, a feed table having a fixed straight upwardly presented elongated guide, a conveyor for the fish having flights located on opposite sides of said guide and moving parallel thereto, said conveyor having means for engaging the body of a fish placed on said guide with its exposed backbone in contact therewith and for moving the fish relatively along the length of said guide, a rotary backbone removing implement mounted adjacent said table and in alignment with said guide, and means on said table on opposite sides of said guide for guiding the movement of said conveyor flights in directions parallel to the length of said guide.

12. In apparatus for removing the exposed backbone from split fish, a feed table having a fixed straight upwardly presented elongated guide, a conveyor for the fish in substantial parallelism with said guide and having at least one flight moving therealong, said conveyor having means for engaging the body of a fish placed on said guide with its exposed backbone in contact therewith and for moving the fish relatively along the length of said guide, and a rotary backbone removing implement mounted adjacent said table and in alignment with said guide.

RALPH M. BERGLUND.

REFERENCES CITED

The following references are of record in the file of this patent:

UNITED STATES PATENTS

| Number | Name | Date |
| --- | --- | --- |
| 1,175,601 | Carson | Mar. 14, 1916 |
| 1,365,575 | Waugh | Jan. 11, 1921 |
| 1,470,807 | Carr | Oct. 16, 1923 |
| 1,709,362 | Meissner et al. | Apr. 16, 1929 |
| 2,368,483 | Monroe | Jan. 30, 1945 |
| 2,397,158 | Savrda | Mar. 26, 1946 |